Sept. 4, 1962  F. C. SCHULTZ-GRUNOW  3,052,357
DEVICE FOR SEPARATING INGREDIENTS OF FLUID MIXTURES
Filed April 26, 1957  4 Sheets-Sheet 1
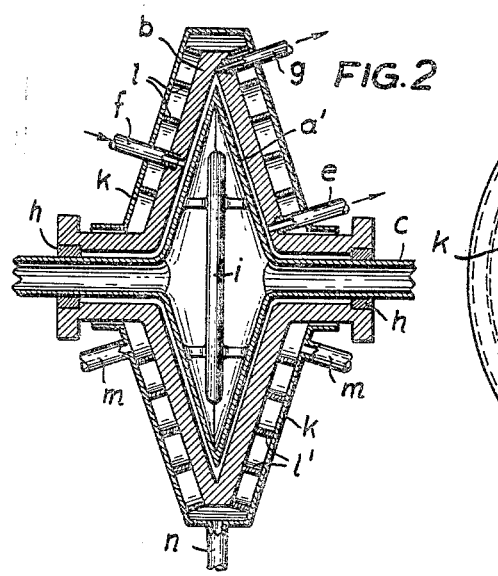
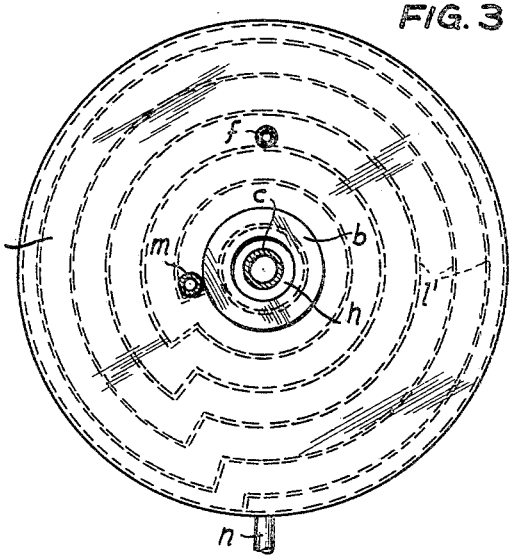
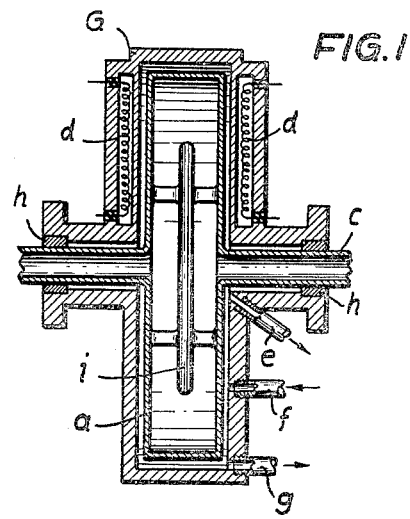
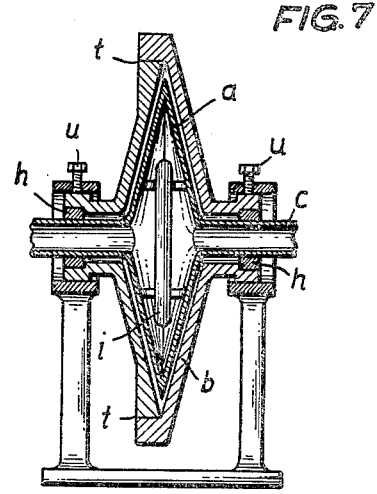
INVENTOR
Fritz Claus Schultz-Grunow

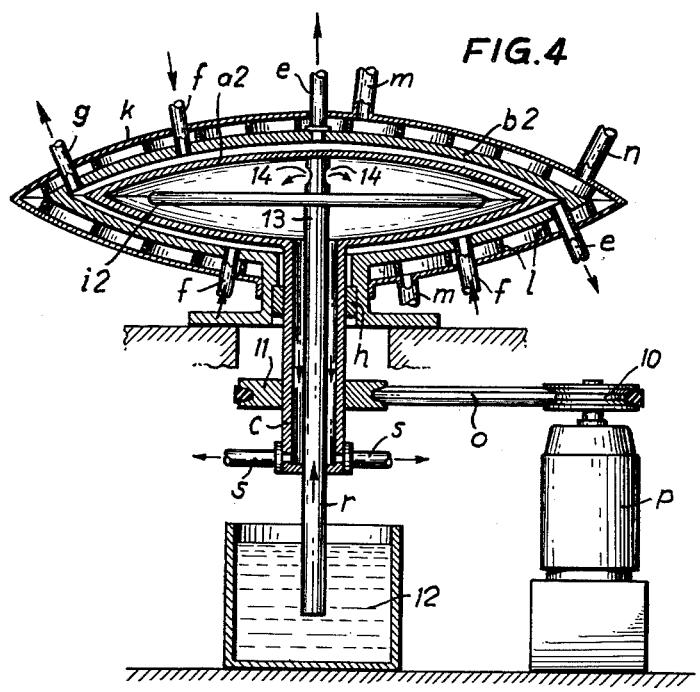
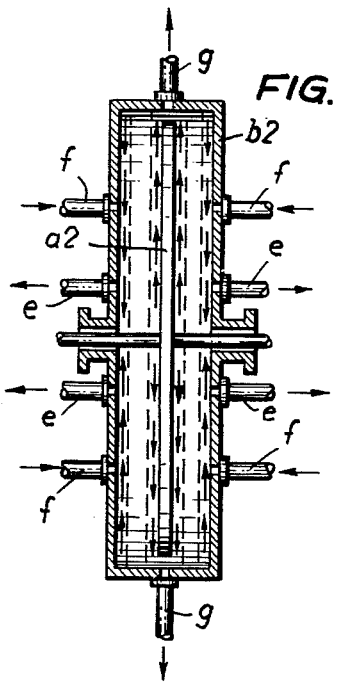
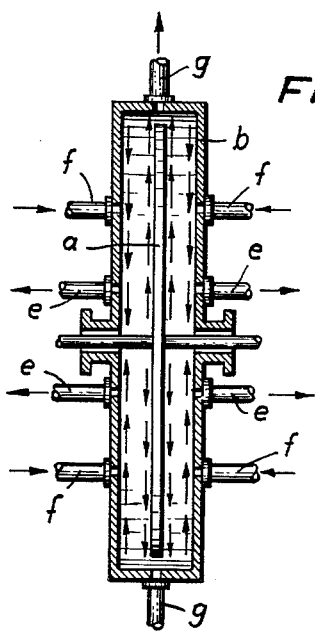

Sept. 4, 1962   F. C. SCHULTZ-GRUNOW   3,052,357
DEVICE FOR SEPARATING INGREDIENTS OF FLUID MIXTURES
Filed April 26, 1957   4 Sheets-Sheet 3

INVENTOR
Fritz Claus Schultz-Grunow
By

INVENTOR
Fritz Claus Schultz-
Grunow

United States Patent Office 3,052,357
Patented Sept. 4, 1962

3,052,357
DEVICE FOR SEPARATING INGREDIENTS
OF FLUID MIXTURES
Fritz Claus Schultz-Grunow, Aachen,
Kuhscheiderweg, Germany
Filed Apr. 26, 1957, Ser. No. 655,408
Claims priority, application Germany Apr. 30, 1956
10 Claims. (Cl. 210—176)

The present invention relates to a device for separating ingredients of gaseous mixtures, liquid mixtures and dust-air mixtures, all of said mixtures henceforth being called fluid mixtures. More specifically, the present invention concerns a device for separating the heavier and lighter components of a fluid mixture from each other by means of thermo-diffusion. By "thermo-diffusion" is meant the partial de-mixing of two gases in the presence of temperature differences. If in a container comprising a mixture of gas molecules of different weight a difference in temperature is produced by heating one side and cooling the other side of said container, the lighter molecules diffuse to the hot side of the container while the heavier molecules diffuse to the cold or cooler side of the container. The separation is thus effected in such a manner that the heavier components are accumulated at the lower temperature while the lighter components are accumulated at the higher temperature.

Thermo-diffusion has been employed heretofore for similar purposes by employing a so-called separating pipe or separating drum. Such separating pipe consists of a vertical cooled pipe having arranged therein an axially extending electrically heatable wire. The ends of the separating pipe are in communication with storage containers for accumulating the lighter components of the respective fluid mixture at the top and the heavier components of said fluid mixture at the bottom. The temperature drop bringing about the separation then prevails been the wire and the pipe wall. The separating effect which is small per se is then increased so as to bring the same up for industrial use by means of a gas flow supported by the temperature drop and flowing upwardly inside and downwardly outside. The employment of a separating pipe for the separation of components of fluid mixtures has the drawback that the requirements for a quick separation and a high degree of separation or separating efficiency cannot be realized at one and the same time. This is due to the fact that a fast separation requires a high pressure and a large pipe diameter, whereas a high separating efficiency requires a small pipe diameter and a low pressure. In addition thereto, high separating efficiency requires a pipe of considerable length in which with small diameter there is arranged an axially extending heating wire while the pipe must be cooled from the outside. Such an arrangement is relatively expensive and requires a considerable number of structural elements. Furthermore, the convection flow produced by the hot wire and essential for an efficient separation of the components of the mixture must have a limited speed only because otherwise turbulence occurs which will destroy the separation. In this connection it may be stated that a convection flow is produced independently of exogeneous forces when temperature differences in gases or liquids equalize each other. The fact that the convection flow must have a limited speed only inherently requires that the separation of the components of the fluid mixture will be effected only slowly. Also it is impossible to obtain any desired high separating efficiency because the small pipe diameter necessary therefor allows only such low speed of the convection flow that the normal diffusion in the longitudinal direction of the pipe will counteract the separation. These drawbacks are due in part to the fact that the speed of the convection flow cannot be controlled independently because it is determined by the temperature field.

By employing a separating drum, it is possible to control the speed of the convection flow by varying the speed of rotation of the drum inasmuch as the rotating drum pulls along the mixture by friction and thus produces the convection flow. Such flow, however, is very sensitive to turbulence and the drum rotating at high speed requires a slide seal which due to the heat developed and the lubricating means chemically affects the fluid mixture and impurifies the same. Furthermore, only one component can be separated or accumulated because the other component will accumulate where the mixture is supplied.

It is, therefore, an object of the present invention to provide an improved device for separating the components of a fluid mixture, which will overcome the above mentioned drawbacks.

It is another object of this invention to provide a device for separating the components of a fluid mixture by employing convection flow, which will considerably increase the convection flow while considerably reducing its sensitivity to turbulence.

It is still another object of this invention to provide a device for separating the components of a fluid mixture by thermo-diffusion and production of convection flows, which will make it possible to control the speed of the convection flow in any desired manner.

It is still another object of this invention to provide a device for separating components of fluid mixtures which will considerably increase the separating efficiency and the yield per time unit over the heretofore known methods and devices for separating fluid components.

These and other objects and advantages of the invention will appear more clearly from the following specification in connection with the accompanying drawings, in which:

FIG. 1 diagrammatically illustrates a section through a device according to the invention for carrying out the method of the present invention.

FIG. 2 is a diagrammatic section through a modified device according to the invention.

FIG. 3 is a side view of FIG. 2.

FIG. 4 is a further modification of a device according to the invention.

FIGS. 5 and 6 illustrate details of the conditions of flow as they prevail in the device according to the invention for separating the components of a fluid mixture.

FIG. 7 shows an arrangement for adjusting the two casing halves of a separating device of the type shown in FIG. 2.

FIG. 12a is a vertical sectional view through an arrangement in which a fluid is retained between the disc and the casing in which it rotates by gas pressure.

Figure 8:
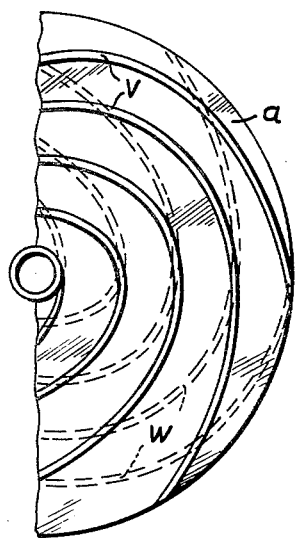
FIG. 8 shows spiral-shaped webs for use in connection with the discs of the devices shown in FIGS. 1 to 7.

The primary characteristic of the present invention consists in that the convection flow for aiding the separation of the components in the fluid mixture is produced by lift forces, friction forces and centrifugal forces. More specifically, while with the above mentioned known separating pipe, the separation of the components of a fluid mixture is aided merely by the buoyancy or lift forces, i.e. by the flow produced by the temperature drop, the present invention additionally employs friction and centrifugal forces for aiding in the separation of the components of the fluid mixture. In this way, the sensitivity to turbulence is considerably decreased while the convection flow is considerably increased. It will be understood that the more a flow is loaded with energy, the less it will be sensitive to turbulence inasmuch as the flow is better guided and held together. The convection flow may be produced by centrifugal forces in any desired manner, i.e. of any desired strength and over any desired distance if in conformity with the present invention a disc is employed which is completely and closely surrounded by a casing. The disc and casing may rotate at different speeds, and the disc and said casing may be maintained at different temperatures. The mixture whose components are to be separated is in the gap between the casing and the disc. This arrangement is based on the finding that independently of the temperature field, merely by friction and centrifugal forces a convection flow is produced in the gap in such a way that border layers form on the walls of the discs and the casing in which border layers the medium to be separated is conveyed radially outwardly and inwardly while said medium rotates practically as rigid body between said border layers. By "border layer" is meant the layer at the border surface of one medium relative to another medium. In said border layer, the molecules are subject to other conditions than in the interior. In particular, in said border layer load distributions occur which follow certain laws and are dependent on the structure of the molecules and are important for many conditions among others friction.

Also with very narrow gaps, the said convection flow exists however with the unimportant difference that the two convection flows adjoin each other, in other words the intermediate area with the medium rotating as rigid body is absent. The convection flow follows the shape of a spiral. By varying the speed and the width of the gap, the length of such spirals and the speed of the convection flow may be varied in any desired manner without producing turbulence. Thus, there exists a second control possibility in addition to the third control possibility namely to be able freely to elect the difference between the speed of the disc and the casing which possibilities are absent when employing a separating pipe or a separating drum.

In connection with the control of the speed and gap between disc and casing it may be added that the speed of each flow passing through a gap may be controlled by varying the width of the gap similar to the manner in which the speed of a gas may be controlled by varying the cross section of a chamber containing the gas. In a tube for instance with large diameter, the speed is less than in a tube with narrow diameter. If for instance a gas mixture passes from a narrow pipe into a wide pipe, the speed is immediately reduced or stopped. By changing the speed, the energy of a flow may be varied at random. At a high speed, naturally the energy will be less. Therefore, by changing the speed, the length of the spirals, and by changing the gap, the speed of the convection flow may be varied. Thus, by narrowing the width of the gap, the speed of the flow will be increased. The length of the spirals are dependent on the speed of the convection flow which means the higher the speed of the convection flow, the longer will be the spirals. The spiral paths of the convection flow cannot be of any desired slight curvature because otherwise the normal diffusion will be noticeable in radial direction and will weaken the separating process. This, however, may be avoided in conformity with the present invention by providing the surfaces of the disc and the wall of the casing with milled-in spiral grooves. The walls of the grooves will prevent transverse diffusion if the oppositely located groove walls of disc and casing leave only a small gap. By "transverse diffusion" is meant the diffusion transverse to the chamber, independently of the formation of spirals.

Depending on whether the light or heavy gas component is to be separated, the fluid mixture is conveyed into the gap at the outer or inner circumference through bores or slots in the casing, and the desired component is similarly withdrawn at the inner or outer circumference. If both components are to be accumulated, the mixture is introduced along a medium diameter while the feeding means in conformity with the most favorable conditions of flow may extend more or less into the gap. The separated or accumulated components are withdrawn as described above. These arrangements have the advantage that the separation can be carried out in a continuous manner. The withdrawal may be made more effective by the provision of a baffle plate.

A separation in successive steps may be obtained by subdividing the gap in annular concentric chambers either by webs or by steps in the disc and the casing. In annular chambers circulatory flows only can be formed. The purpose of the annular chamber consists in so guiding the flow that it moves circularly, i.e. concentrically along a circular path. As has been brought out above in the objects of the present invention, the primary object of the invention consists in the provision of a highly efficient separation of the components of a fluid mixture. Inasmuch as the effect by cooling one and heating the other side of a casing is rather low, according to the present invention it is the tendency to aid the convection flow again and again. An increase in this direction is effected by providing a succession of separating chambers thereby increasing the separating effect.

A further step in conformity with the present invention for increasing the separating efficiency and the yield per time unit consists in providing a cone-shaped gap. With such an arrangement a component of the centrifugal force will be effective transverse to the gap whereby with corresponding shape of the cone the heavy component will be pressed against the cold wall while the light component will be pressed against the other namely the hot wall.

The method of the invention will best be understood with reference to the drawings. According to FIG. 1 showing a cross section through a device according to the invention, the character $a$ represents a hollow disc which is rotatably connected to a hollow shaft $c$. Both the disc and the shaft $c$ are hollow in order to allow the supply of a cooling medium or a heating medium into and the withdrawal thereof from the disc while allowing the cooling or heating medium to pass in a continuous flow therethrough. The shaft $c$ is journalled in any convenient manner. However, if desired the disc may also be journalled only unilaterally. As shown in the drawing, the disc $a$ is provided with a guiding disc $i$ around which the heating or cooling means flows. The purpose of the guiding disc $i$ consists in guiding the heating or cooling means in the disc $a$ so as to pass the heating or cooling means through the entire interior of the disc $a$ to bring about a maximum heating or cooling effect. The casing $G$ may for instance be provided with electric heating elements comprising wire windings $d$ adapted to be heated electrically. The inlet and outlet passages for the fluid mixture to be treated and for the separated components are designated with the reference numerals $e$, $f$ and $g$. The shaft carrying the disc $a$ may be integral therewith and is sealed by stuffing boxes $h$.

While FIG. 1 illustrates the casing $G$ as consisting of one piece, it is, of course, understood that in order to be able to mount the disc $a$ inside the casing, the casing must be composed of at least two portions. The casing portions may be arranged in such a manner as to be able to vary the gap between the disc *a* and the casing as will be described later.

In FIG. 2, *a'* designates a hollow cone shaped disc rotatably supported in a correspondingly shaped housing *b*. Within said disc *a'* there is mounted a guiding disc *i* for guiding a cooling or heating medium in case the disc is to be heated or cooled respectively. The mixture to be separated is fed through pipe *f* of the medium radius. The enriched components are withdrawn through pipes *e* and *g*.

This shape is advantageous when the components of the fluid mixture are to be separated under pressure, because this cone shape of the disc and casing has a higher pressure resistance than the cylindrical shape shown in FIG. 1.

In order to be able to cool or heat the housing *b* as the case may be, a jacket *k* surrounds the said housing. Between jacket *k* and housing *b*, cooling or heating media are introduced through conduit *m*, while the respective cooling or heating medium is discharged through conduit *n*. For purposes of sealing the interior of the housing, shaft *c* is provided with slidable seals *h*. Within the chamber formed by jacket *k* and housing *b* there are arranged spiral shaped guiding means 1' (seen in FIG. 3) for guiding the heating and cooling medium respectively.

FIG. 4 shows the rotary disc *a2* arranged on a vertical axis which is hollow and may be heated or cooled. Shaft 13, attached to the inside of the disc, is hollow and immerses into a container 12 containing the cooling or heating fluid. The fluid rises through hollow shaft 13 upwardly in conformity with the arrow and passes through openings 14 into hollow disc *a2* as likewise indicated by the arrow, whereupon it flows around the guiding or baffle element *i2* and flows downwardly around hollow shaft 13 (see arrow). From here the fluid passes through pipes S (see arrow). Shaft 13 is rotatable and is adapted to be driven by an electric motor *p*, preferably a variable speed motor, through the intervention of a transmission 11, 0, 10, and the tubular extension *c* of disc *a2* that surrounds shaft 13.

The housing *b2* surrounds disc *a2*. The gap thus formed is sealed by a seal *h*. The mixture to be split up is introduced through pipe *f* into the gap between disc *a2* and housing *b2* and the enriched components are withdrawn from said gap through pipes *e* and *g*.

Housing *b2* is surrounded by jacket *k*. The space thus created between housing and the jacket serves for receiving cooling or heating fluid which is introduced through pipe *m* and discharged through pipe *n*. Spiral-shaped guiding means 1 serve for guiding said fluid around the space between the housing and jacket.

The arrangement of FIG. 4 differs from the arrangements of FIGS. 1 and 2 furthermore in that the disc is only unilaterally journalled. The radially arranged discharge conduits *s* will, during rotation of the disc *a2* exert a kind of pumping effect thereby aiding in the passage of the fluid mixture through the inside of the disc *a2*.

The flow of the mixture to be separated as it will be produced in the gap between the disc *a2* and the casing *b2* is illustrated in FIGS. 5 and 6 with the assumption that the disc rotates and the casing is at a standstill or the disc rotates at a higher speed than the casing if the latter should be rotated. As will be seen from FIGS. 5 and 6, there exists on the discs *a* and *a2* a flow component directed outwardly and there also exists a flow component on the walls of the casings *b* and *b2* directed inwardly in border layers on said walls. If a narrow gap is provided between the casing and the disc, the two border layers fill the entire width of the gap. With wider gaps as illustrated in FIG. 6, between the border layers in the space indicated by dash lines, there exists a flow without radial component which flow rotates like a rigid body. However, for the separation of the components of the respective fluid it is not decisive whether the said rotating flow is present or not. The inlet conduits are designated with the reference numeral *f*, whereas the outlet conduits for the gap are designated with the reference numerals *e* and *g*.

Referring now to FIG. 7, this figure indicates how the two halves of the casing may be displaced relative to each other. As will be seen from FIG. 7, the two casing halves meet each other along the joint *t* along which they are slidable relative to each other. The casing halves are held in their respective position by screws *u*.

Figure 9:
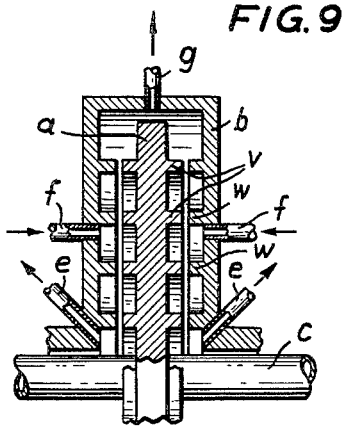
FIG. 9 is a section through the spiral-shaped webs of FIG. 8.

FIG. 8 shows in full line spiral-shaped webs *v* which are mounted upon the disc while similar spiral-shaped webs *w* are mounted on the opposite side of the disc and are indicated in dash lines. These webs the shape of which corresponds to the flow of fluid along the walls prevent the normal diffusion transverse to the lines of flow. The cross section of the webs *v* and *w* is shown in FIG. 9.

Figure 10:
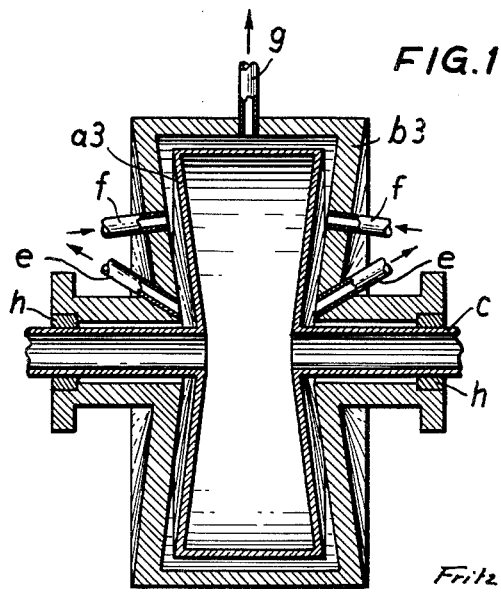
FIG. 10 shows a further modification of an arrangement according to the invention.

According to FIG. 10, hollow disc *a3* has a cylindrical periphery and cone shaped ends convex toward each other and is connected to shaft *c* which, similar to the disc, is designed hollow so that a cooling or heating fluid may be introduced through the hollow shaft into disc *a3*.

Disc *a3* is surrounded by a correspondingly shaped housing *b3*. The thus created gap is sealed toward the outside by a seal *h*. The cone-shaped design has the purpose of bringing about that the heavy components separated on the disc will be pressed against the disc to prevent them from being intermixed. The feeding and withdrawing of the components will be effected in the same manner as described in connection with FIG. 1 by pipes *f*, *e*, and *g*.

As will be seen from FIG. 10, the width of the disc *a3* increases with increasing radius while the casing *b3* is shaped correspondingly. When the disc *a3* is cooled and the casing *b3* is heated, the heavier component of the fluid will be deposited on the disc *a3* whereas the lighter component of the fluid will be deposited on the casing *b3*. When the speed of rotation of the disc is higher than that of the casing, the said components will by the component of the centrifugal force be pressed against the walls perpendicular to the gap whereby the separating force will be greatly aided. This aiding effect also prevails with the cone-shaped gap according to FIG. 2 when the disc is hot and the casing is cool while the casing has a higher speed of rotation than the disc.

Figure 11:
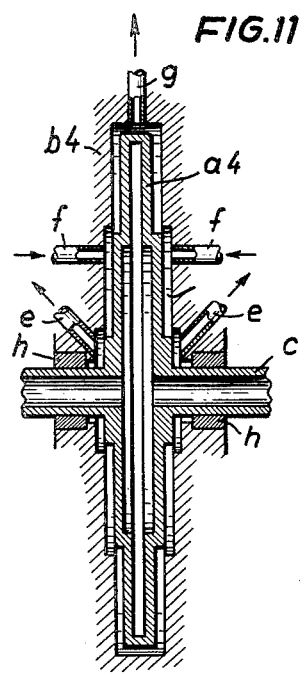
FIG. 11 is a still further modification of a device according to the invention.
Figure 12:
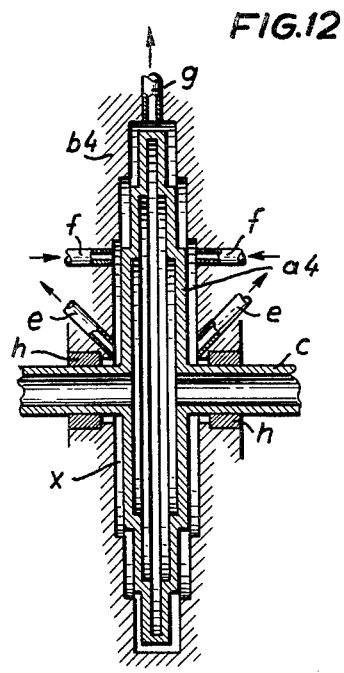
FIG. 12 is an arrangement similar to that of FIG. 11 with different dimensions of the steps and gaps in FIG. 11.

FIGS. 11 and 12 show hollow discs *a4* having a step-shaped appearance. The housings *b4* surrounding these discs are shaped in conformity with the shape of the discs *a4* to create the desired narrow gap between disc and housing. The disc is journalled on horizontal shaft *c* for the purpose of rotation. One step of the housing has been designated (FIG. 12) with the reference character *x*. Slide seals *h* are provided as seals for the gap between disc *a4* and housing *b4*.

FIG. 12 shows a design which differs from FIG. 11 primarily in that the width and the length of the steps are different, whereas they are uniform in FIG. 11. The steps are so designed that the length and width thereof decreases with the radius.

FIG. 12a is a vertical sectional view through an arrangement in which a fluid is retained between the disc and the casing in which it rotates by gas pressure. According to this arrangement disc *a* turns in casing *b* and is supported in a tubular projection extending from the casing on the ball bearings *h*. In this modification, a fluid is disposed in the gap between disc *a* and casing *b*. This fluid is retained in the gap by supplying gas pressure into the tubular projection through passage *r'*, which gas passes through the labyrinth passage *m'* and exhausts through passage *s'*. The pressure of the gas will decrease through the labyrinth and the pressure at the upper end thereof is sufficient to hold the fluid in the gap.

Figure 13:
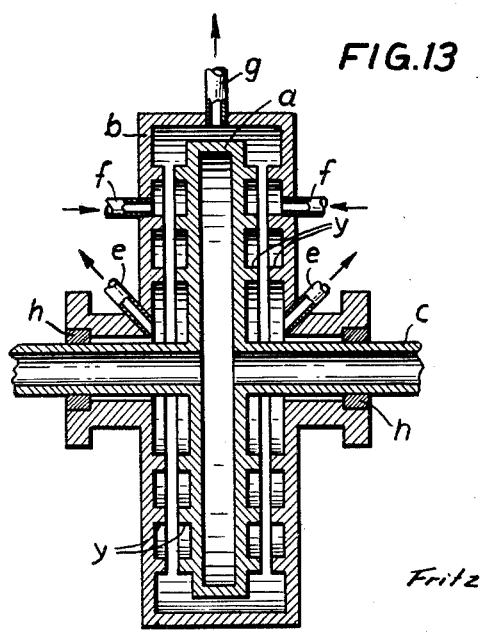
FIG. 13 represents a diagrammatic section through a still further embodiment of a device according to the invention.

FIG. 13 shows a disc *a* within housing *b* surrounding said disc, which latter is hollow and journalled on hollow horizontal shaft c. The gap between disc and housing is sealed by slide seals h. The characteristic feature of the design according to FIG. 13 consists in that circularly concentrically arranged webs y are provided in said gap whereby the gap between housing b and disc a is subdivided into a number of chambers. These webs may be fastened at both walls of the gap or on one of these walls only.

In the modifications of FIGS. 11, 12, and 13, the hollow shafts are availed of for supplying a fluid heating or cooling medium to the inside of the hollow disc.

Also the fluid to be separated, as in the previous modifications, is introduced and withdrawn from between the disc and housing by way of pipes e, f, and g.

It is, of course, to be understood that the present invention is, by no means, limited to the particular constructions shown in the drawings but also comprises any modifications within the scope of the appended claims.

What I claim is:

1. A device for separating the constituents of gas mixtures, liquid mixtures and dust-air mixtures by thermodiffusion, which includes: a casing, a disc-shaped member having a substantially plane surface arranged within and closely fitting said casing so as to cause the outer wall of said disc-shaped member to define with the inner wall of said casing an annular and circumferentially unobstructed passage through said casing for the mixture the constituents of which are to be separated from each other, said casing being provided with opening means at the outer and inner periphery thereof and intermediate the inner and outer periphery for admitting the mixture into said casing and for withdrawing the respective constituent from said casing, a shaft extending through said casing and connected to said disc-shaped member, means for effecting relative rotation between said casing and said disc-shaped member, and means for producing a difference in temperature between said casing and said disc-shaped member and for maintaining said difference for a desired period of time.

2. A device for separating the constituents of gas mixtures, liquid mixtures and dust-air mixtures by thermodiffusion, which includes: a casing, a disc-shaped member having a substantially plane surface arranged within and closely fitting said casing so as to cause the outer wall of said disc-shaped member to define with the inner wall of said casing an annular and circumferentially unobstructed passage through said casing for the mixture the constituents of which are to be separated from each other, said casing being provided with opening means at the outer and inner periphery of said casing and with an opening means intermediate said other opening means for respectively withdrawing separated constituents from and introducing the mixture whose constituents are to be separated from each other into said casing, the arrangement being such that the constituents are being withdrawn through the openings at the outer and inner periphery of said casing and the said mixture is introduced through said opening means at a radius intermediate said other opening means, a shaft extending through said casing and connected to said disc-shaped member, means for effecting a relative rotation between said casing and said disc-shaped member, and means for producing a difference in temperature between said casing and said disc-shaped member and for maintaining said difference for a desired period of time.

3. A device for separating the constituents of gas mixtures, liquid mixtures and dust-air mixtures by thermodiffusion, which includes: a casing, a hollow disc-shaped member having a substantially plane surface arranged within and closely fitting said casing so as to cause the outer wall of said disc-shaped member to define with the inner wall of said casing an annular and circumferentially unobstructed passage for the mixture the constituents of which are to be separated from each other, a hollow shaft extending into said casing and supporting said hollow disc-shaped member, the interior of said hollow shaft communicating with the interior of said hollow disc-shaped member and being arranged for selectively feeding a heat exchange medium into and withdrawing the same from said hollow disc-shaped member, a shaft extending through said casing and connected to said disc-shaped member, means for effecting a relative rotation between said casing and said hollow disc-shaped member, means for producing a difference in temperature between said casing and said hollow disc-shaped member and for maintaining said difference for a desired period of time, means located intermediate the inner and outer peripheries of said casing for introducing into said passage the mixture to be separated, and means respectively located adjacent the outer circumference of said casing, and adjacent the inner circumference thereof, for withdrawing portions of said mixture which has been subjected to said separation treatment.

4. A device according to claim 3, in which guiding wall means are arranged in said hollow disc-shaped member for guiding the heat exchange medium through the interior of said hollow disc-shaped member.

5. A device for separating the constituents of gas mixtures, liquid mixtures and dust-air mixtures by thermodiffusion, which includes: a casing, a disc-shaped member having a substantially plane surface arranged within and closely fitting said casing so as to cause the outer wall of said disc-shaped member to define with the inner wall of said casing an annular and circumferentially unobstructed passage through said casing for the mixture the constituents of which are to be separated from each other, heating means supported by said disc-shaped member for heating the same, means for effecting a relative rotation between said casing and said disc-shaped member, means for producing a difference in temperature between said casing and said disc-shaped member and for maintaining said difference for a desired period of time, means located intermediate the inner and outer peripheries of said casing for introducing into said passage the mixture to be separated, and means respectively located adjacent the outer circumference of said casing, and adjacent the inner circumference thereof, for withdrawing portions of said mixture which has been subjected to said separation treatment.

6. A device for separating the constituents of gas mixtures, liquid mixtures and dust-air mixtures by thermodiffusion, which includes: a casing, a disc-shaped member having a substantially plane surface arranged within and closely fitting said casing so as to cause the outer wall of said disc-shaped member to define with the inner wall of said casing an annular and circumferentially unobstructed passage through said casing for the mixture the constituents of which are to be separated from each other, heating means supported by said casing for heating the same, means for effecting a relative rotation between said casing and said disc-shaped member, means for producing a difference in temperature between said casing and said disc-shaped member and for maintaining said difference for a desired period of time, means located intermediate the inner and outer peripheries of said casing for introducing into said passage the mixture to be separated, and means respectively located adjacent the outer circumference of said casing, and adjacent the inner circumference thereof, for withdrawing portions of said mixture which has been subjected to said separation treatment.

7. A device for separating the constituents of gas mixtures, liquid mixtures and dust-air mixtures by thermodiffusion, which includes: a casing, a disc-shaped member having a substantially plane surface arranged within and closely fitting said casing so as to cause the outer wall of said disc-shaped member to define with the inner wall of said casing an annular and circumferentially unobstructed passage through said casing for the mixture the constituents of which are to be separated from each other, jacket means surrounding said casing and arranged selectively to receive heating or cooling fluid means for respectively heating or cooling said casing, means for effecting a relative rotation between said casing and said disc-shaped member, means for producing a difference in temperature between said casing and said disc-shaped member and for maintaining said difference for a desired period of time, means located intermediate the inner and outer peripheries of said casing for introducing into said passage the mixture to be separated, and means respectively located adjacent the outer circumference of said casing, and adjacent the inner circumference thereof, for withdrawing portions of said mixture which has been subjected to said separation treatment.

8. A device for separating the constituents of gas mixtures, liquid mixtures and dust-air mixtures by thermo-diffusion, which includes: a casing confining a chamber having a cross section of lens shaped contour, a disc-shaped member arranged within and closely fitting said casing and having an outer contour corresponding substantially to the inner contour of said casing so as to cause the outer wall of said disc-shaped member to define with the inner wall of said casing an annular and circumferentially unobstructed passage through said casing for the mixture the constituents of which are to be separated from each other, a shaft extending through said casing and connected to said disc-shaped member, means for effecting a relative rotation between said casing and said disc-shaped member, and means for producing a difference in temperature between said casing and said disc-shaped member and for maintaining said difference for a desired period of time, port means in the casing adjacent the inner and outer circumference of said disc-shaped member for withdrawing from the casing the separated portions of a mixture subjected to separating treatment in said passage, and inlet port means in the casing located radially between said first mentioned port means for introducing the mixture to be separated into said passage.

9. A device for separating the constituents of gaseous mixtures, liquid mixtures and dust-air mixtures by thermo-diffusion, which includes: a casing, a disc-shaped member having a substantially plane surface, rotatably mounted within and closely fitting said casing, said disc-shaped member and said casing being arranged to define an annular and circumferentially unobstructed flow passage between said disc-shaped member and the inner wall of said casing, for the mixture during course of separation, a shaft extending through said casing and connected to said disc-shaped member, means for effecting a relative rotation between said casing and said disc-shaped member, means for internally heating or cooling said disc-shaped member and means for externally heating or cooling said casing, means respectively located adjacent the outer circumference of said casing and adjacent the inner circumference thereof and communicating with said flow passage for withdrawing portions of said mixture which has been subjected to said separation treatment, and means located between the inner and outer circumferences of said casing and communicating with said passage for introducing into the passage the mixture to be separated.

10. A device for separating the constituents of gaseous mixtures, liquid mixtures and dust-air mixtures by thermo-diffusion, which includes: a casing, a disc-shaped member having a substantially plane surface rotatably mounted within and closely fitting said casing, said disc-shaped member and said casing being arranged to define an annular and circumferentially unobstructed flow passage between said disc-shaped member and the inner wall of said casing, for the mixture during the course of separation, said disc-shaped member and said casing being movable relative to each other for varying the width of said passage, a shaft extending through said casing and connected to said disc-shaped member, means for effecting a relative rotation between said casing and said disc-shaped member and operable selectively to vary the speed of said rotation and to thereby vary the speed of flow of said mixture through said passage, means for internally heating or cooling said disc-shaped member and means for externally heating or cooling said casing, means respectively located adjacent the outer circumference of said casing and adjacent the inner circumference thereof and communicating with said flow passage for withdrawing portions of said mixture which has been subjected to said separation treatment, and means located between the inner and outer circumferences of said casing and communicating with said passage for introducing into the passage the mixture to be separated.

References Cited in the file of this patent
UNITED STATES PATENTS

| | | |
|---|---|---|
| 2,521,112 | Beams | Sept. 5, 1950 |
| 2,585,244 | Hanson | Feb. 12, 1952 |
| 2,743,014 | Frazier | Apr. 24, 1956 |
| 2,743,015 | Jansma | Apr. 24, 1956 |
| 2,788,900 | Thomas | Apr. 16, 1957 |